US005965234A

United States Patent [19]

Solano

[11] Patent Number: 5,965,234

[45] Date of Patent: Oct. 12, 1999

[54] FLEXIBLE WALL COVERING

[76] Inventor: Michael J. Solano, 10 W. Blackwell St., Dover, N.J. 07801

[21] Appl. No.: 08/938,596

[22] Filed: Sep. 25, 1997

[51] Int. Cl.[6] .............................. B32B 3/10; B32B 13/04; D06N 7/02

[52] U.S. Cl. .......................... 428/143; 428/144; 428/150; 428/312.4; 428/484; 428/703

[58] Field of Search ..................................... 428/143, 144, 428/150, 312.4, 703, 484, 486, 488.1

[56] References Cited

U.S. PATENT DOCUMENTS

| | | | |
|---|---|---|---|
| 4,349,588 | 9/1982 | Schiffer | 427/230 |
| 5,030,502 | 7/1991 | Teare | 428/143 |
| 5,269,861 | 12/1993 | Gilbreath | 156/98 |
| 5,741,844 | 4/1998 | Nass et al. | 524/523 |

*Primary Examiner*—Blaine Copenheaver
*Attorney, Agent, or Firm*—Alfred C. Hill

[57] ABSTRACT

The method of manufacturing a flexible wall covering that replicates a finish selected from a traditional encaustic finish, a traditional stone finish and a traditional plaster finish comprises the steps of adding a flexible resin to a KOLCAUSTICO solution to provide a flexible resin-KOLCAUSTICO compound; applying at least one layer of the flexible resin-KOLCAUSTICO compound to a flexible carrier sheet in a predetermined pattern; letting the one layer of the flexible resin-KOLCAUSTICO compound dry; and burnishing the one layer of the flexible resin-KOLCAUSTICO compound after drying to produce a desired sheen that replicates a finish selected from a traditional encaustic finish, a traditional stone finish and a traditional plaster finish.

7 Claims, 1 Drawing Sheet

FLEXIBLE WALL COVERING

BACKGROUND OF THE INVENTION

The present invention relates to a flexible wall covering and more particularly to a flexible wall covering and the method of manufacturing the same that replicates a selected one of a traditional encaustic finish, a traditional stone finish and a traditional plaster finish.

Encaustic art has been known for thousands of years and is art work that is rendered with a wax paint that has been processed with heat to fuse the wax paint to itself and the support for the paint. Traditionally, these encaustic finishes have been applied in thicker coats and uses a more brittle material that would certainly be unsuitable for a "flexible wall covering. One known and preferred synthetic encaustic plaster for the present invention is identified by the trademark KOLCAUSTICO and has been used to provide a variation"; of the encaustic technique directly on walls. This commercially available material is capable of producing a stone-like appearance which may be polished to a high sheen that is characteristic of encaustic art, or with the addition of a flattening agent, will replicate a traditional plaster finish. This material and similar encaustic plaster materials have been designed to be applied directly to walls. However, these products are hard and brittle and, therefore, unsuitable for a flexible wall covering. Furthermore, it is difficult to achieve a completely even application in regard of a well balanced color or design due to preexisting imperfections in the wall. The process of repairing a wall only adds several labor hours.

Using a multi-color technique presents further complications because, in the application of several coats, it is difficult to achieve a smooth look.

The available products, such as KOLCAUSTICO, have been available and were developed to be directly applied to the wall surface. Some disadvantages of this process include the extreme difficulty in repairing a decorative plaster surface that has been damaged or cracked, the high cost of employing a specially trained artisan to perform the time-consuming custom application, and the difficulty of removing such a finish from the wall surface. In addition, one is limited to the design capabilities when using direct wall application as it is a laborious process to administer a variety of techniques to the vertical structure of a wall. However, other products used to generate a plaster or stone finish lack the ability to create the gloss or sheen appearance that is characteristic of encaustic finishes. Thus, the wall appears flat and dull, and further limits the accessibility of several design possibilities.

Other problems related to the use of traditional encaustic materials include the ingredients of wax, solvents and other volatile elements that are highly flammable and, therefore, not conducive to either residential or commercial use. Most paints with the intended use of wall applications that are commercially available are premixed with substances that are designed to achieve a desired degree of sheen when dry. For example, a flat sheen reflects little or no light, while on the other side of the broad spectrum, a high sheen reflects multiple light rays in the selected painted object, thereby producing a glossy or shiny finish. These products are, however, narrowed by the fact that the amount of sheen in the final product will be uniform throughout the selected painted object, such as a wall, and not conducive to achieving a desired design by varying the sheen.

SUMMARY OF THE INVENTION

An object of the present invention is to provide a wall covering which can be readily hung over an existing wall, is durable and wear resistant, is highly transportable, and which, will replicate the appearance of the classic hot wax painting process (encaustic painting process) and differs from the inherent brittleness and flammability of that process.

Another object of the present invention is to reinstate the use of traditional encaustic art in flexible wall coverings.

Still another object of the present invention is to provide a method of producing a flexible wall covering that has the ability to replicate either a traditional encaustic finish, or a traditional stone finish or a traditional plaster finish, while minimizing the time, cost and complications of applying the traditional encaustic, plaster or stone finishes directly to a wall.

Still another object of the present invention is to provide a method and a wall covering for producing a durable, flexible and flame resistant wall covering that resembles the traditional encaustic finishes and can be modified to resemble a plaster or stone-like finish.

A further object of the present invention is to provide a method for a producing a flexible wall covering which can be applied over preexisting imperfections in a wall after only minimal preparation of the wall, thus saving labor hours.

An object of the present invention is to provide a wall covering that is easy to repair if a section is damaged, or cracked and it is easier to remove than the direct application products. Further, in accordance with the present invention the produced flexible wall covering actually prevents walls from cracking and holds old plaster walls together, as the preferred carrier sheet is a type of wall liner designed specifically for this use.

Still a further object of the present invention is to provide a method of providing a flexible wall covering which allows the artist to work in a controlled work shop setting, thus contributing to the unlimited techniques that can be applied in such a setting. Hence, the artist is able to shift variables easily, and to utilize an assortment of machinery and appliances that would be difficult to transport to and utilize at the location of the direct application.

Still another further object of the present invention is to provide a wall covering that is capable of producing either a flat, dull appearance or a shiny polished appearance, or that can be manipulated in any combination to create many different appearances.

The utilization of a variety of machines on the finished product renders an appearance which closely resembles the effects of natural elements of weather and time.

A feature of the present invention is the provision of a method of manufacturing a flexible wall covering that replicates a selected one of a traditional encaustic finish, a traditional stone finish and a traditional plaster finish comprising the steps of adding a flexible resin to a KOLCAUSTICO solution to provide a flexible resin-KOLCAUSTICO compound; applying at least one layer of the flexible resin-KOLCAUSTICO compound to a flexible carrier sheet in a predetermined pattern; letting the one layer of the flexible resin-KOLCAUSTICO compound dry; and burnishing the one layer of the flexible resin-KOLCAUSTICO compound after drying to produce a desired sheen that replicates a selected one of a traditional encaustic finish, traditional stone finish and a traditional plaster finish.

Another feature of the present invention is the provision of a flexible wall covering to replicate a selected one of a traditional encaustic finish, a traditional stone finish and a traditional plaster finish comprising a flexible carrier sheet;

and at least one layer of a flexible resin-KOLCAUSTICO compound disposed on the flexible carrier sheet in a predetermined pattern, the one layer of the flexible resin-KOLCAUSTICO compound having a desired sheen to replicate a selected one of a traditional encaustic finish, a traditional stone finish and a traditional plaster finish.

BRIEF DESCRIPTION OF THE DRAWING

Above-mentioned and other features and objects of the present invention will become more apparent by reference to the following description taken in conjunction with the accompanying drawing, in which.

DESCRIPTION OF THE PREFERRED EMBODIMENTS

Figure 1:
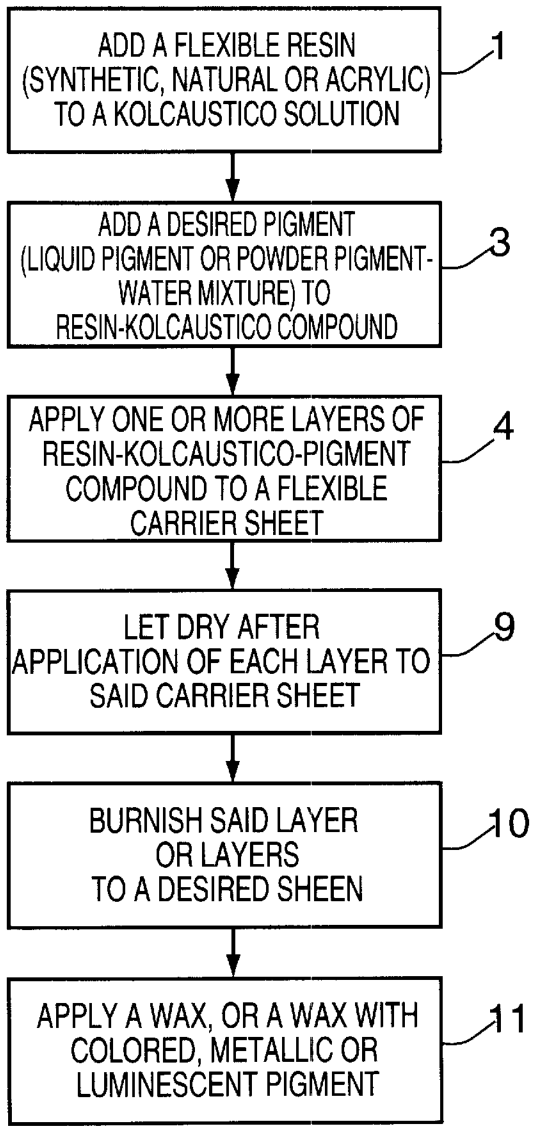
FIG. 1 is a flow diagram of the method of manufacturing a flexible wall covering in accordance with the principles of the present invention.

Referring to FIG. 1, there is illustrated therein a flow chart depicting the method of manufacturing a flexible wall covering that replicates a selected one of a traditional encaustic finish, a traditional stone finish and a traditional plaster finish in accordance with the principles of the present invention. Each block in this flow diagram represents one step in the process of making the flexible wall covering 2 shown in FIG. 2.

The first step shown in FIG. 1 in block 1 indicates that a flexible resin is added to the commercially available "synthetic encaustic plaster product whose trademark is KOLSAUSTICO, or an equivalent synthetic encaustic plaster product. KOLCAUSTICO is a"; solution to which a flexible resin is added with the flexible resin being either of a synthetic or natural base, which is used to provide the flexibility to the KOLCAUSTICO solution needed in order for the finished product to be utilized as a flexible wall covering. An acrylic flexible resin, which is clear in nature, is preferred. Such a resin contributes to the translucency of the finished product, creates better bonding to the backing or carrier sheet, and provides the higher level of flexibility or elasticity needed to allow the wall covering to turn a corner without cracking or delaminating and to cut the wall covering without chipping.

The preferred ratio of flexible resin to KOLCAUSTICO could vary from 2 to 8 percent.

The second step in the process shown in block 3 of FIG. 1 relates to adding the desired pigment to the flexible resin-KOLCAUSTICO compound. The amount and type of pigment to be added varies according to the particular design desired by the artist.

The preferred pigment includes commercially available pigments, such as a product whose trademark is CAL-TINTS which are concentrated liquid color tints. Such tints are added in any combination and proportion to create a large color range. The addition of a straight color pigment, as described above, allows the flexible resin-KOLCAUSTICO compound to be burnished or polished to a very high glass-like sheen.

Other methods of creating a pigment are by adding water to a commercially available pigment, such as the commercially available CAL-TINTS, or to add water to a dry pigment, which are also commercially available and may be produced either naturally or synthetically. The pigment-water mixture is then added to the flexible resin-KOLCAUSTICO compound.

The addition of water to a color pigment, as described above, acts as a flattening agent. Thus, when polished or burnished, the final product will produce less sheen. The amount of water added to the pigment will directly effect the amount of sheen apparent in the final product.

The pigment-water ratio may vary in range from 0.01% water to 99.99% pigment to 0.01% pigment to 99.99% water.

This pigment-water mixture may then be added to the flexible resin-KOLCAUSTICO compound in varying degrees from 0.1% to 25%.

The artisan may desire not to use a pigment to color the flexible resin-KOLCAUSTICO compound since he may desire to use just the translucency of the acrylic flexible resin to form his patterns and to achieve the desired finished product.

The next step of the process is shown in block 4 of FIG. 1. This step relates to applying the flexible resin-KOLCAUSTICO compound or the flexible resin-KOLCAUSTICO-pigment compound to a flexible carrier sheet 5 shown in FIG. 2. The preferred carrier sheet 5 is a commercially available, white non-woven paper which is marketed, sold and used primarily as a wall liner. Such a product is produced nationally by many manufacturers. This particular carrier sheet is preferred because the compound or composite mixture (the flexible resin-KOLCAUSTICO compound or the flexible resin-KOLCAUSTICO-pigment compound) bonds well with the surface of this carrier sheet. The carrier sheet 5 is able to bridge uneven surfaces, and prevents distortion of the wall. However, the compound as mentioned above has been found to work well with many commercially available wall covering backings, such as woven backings, non-woven backings, fabrics, fiberglass, vinyls and papers.

There are several methods in which the above-mentioned compound may be applied to the carrier sheet 5. This includes, but is not necessarily limited to, the use of a trowel, a simple spreading machine, silk-screening, or the use of industrial machinery currently in use for the manufacture of a texture or vinyl wall covering.

Figure 2:
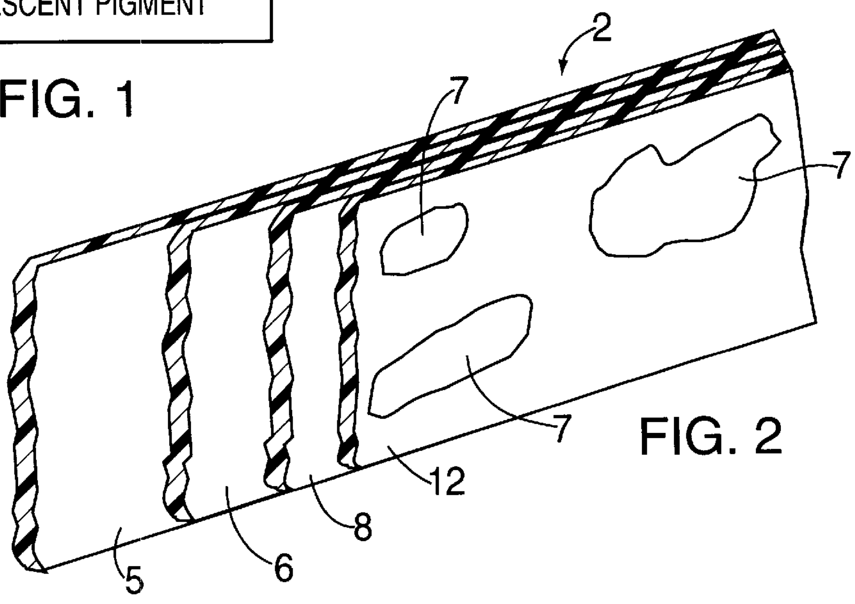
FIG. 2 is a plan view of a flexible wall covering manufactured in accordance with the principles of the present invention.

The layer of the compound in block 3, FIG. 1 is shown in FIG. 2 as layer 6.

The method of using a trowel is performed by using a hand-held trowel to spread the compound of block 3, FIG. 1 either in a smooth even finish or in a rough, textured finish. In another application, the compound of block 3, FIG. 1 may be spread in decorative design leaving some of the backing material 5 exposed as shown at 7 in FIG. 2. A second layer or coating 8 may be applied once the first coat 6 is dried or while the first coat 6 is still wet. The second covering or layer 8 may be of a different color or tone and may be applied over the entire surface, or only in the uncovered areas 7, depending on the translucency of the material, and on the consistency and texture of the first layer 6. A design is thereby produced, showing part of the first layer 6 through the second layer 8. Additional layers and colors may be applied in a similar fashion.

The method of using a simple spreading machine is performed by utilizing a commercially available machine called a "paste" well, whereby a liquid is placed in the well portion of the machine with the carrier sheet 5 placed below. Carrier sheet 5 is then pulled through the machine while a squeegee apparatus beneath the paste well controls the amount of the compound of block 3, FIG. 1 that is transferred to the sheet 5.

The method of using a silk-screen machine is performed by utilizing any one of the wide variety of devices presently in use for the purpose of transferring color or design. The silk-screening process is accomplished by squeezing the compound of block 3, FIG. 1 through the opening of the silk-screen which has been prepared with a design. The liquid compound in block 3, FIG. 1 is then applied to the silk-screen with a squeegee device, passing through only the unexposed areas of the screen to create the desired design. Furthermore, the silk-screening process may be completed in any number of several combinations. For example, the design may be applied to an existing layer of the compound of block 3, FIG. 1 over a blank carrier sheet, to an existing preprinted wall covering of any nature, or may be applied by a silk-screen and then worked over with the trowel technique as described above.

There exists many different techniques of employing printing machines to print a flat or textured finish onto a material that can be augmented for this compound.

The method concerning the use of industrial machinery currently used for the manufacturing of commercial wall covering is performed by utilizing this industrial machinery with the compound of block 3, FIG. 1. This process is achieved by substituting the compound of block 3, FIG. 1 for the liquid substance used to conventionally produce a wall covering, such as a vinyl or texture substance.

The fourth step of the process is shown in block 9 of FIG. 1 and relates to the drying process between layers 6 and 8 and other layers that may be applied when using any of the above methods of applying the compound of block 3, FIG. 1 to the carrier sheet 5. The initial layer or layers may be dried prior to applying any additional layers. Once the initial layer or layers are dried they may be chafed with sandpaper in order to smooth down any high spots in the design. The artist may choose to burnish or polish the initial layer or layers in order to increase the sheen prior to applying additional layers.

The fifth step is illustrated in block 10 of FIG. 1 and relates to the burnishing of the layer 6 or 8 or any other layer of the compound thus creating the encaustic effect of a glossy, shiny appearance. The act of burnishing provides the necessary heat from which the traditional encaustic effect is rendered. This may be accomplished by the usage of an industrial or commercial buffer machine which is traditionally used to polish such objects as, cars and flooring. Such a machine has a motorized buffer pad which spins, and when put in direct contact with the compound of block 3, FIG. 1 in the layer or layers on carrier sheet 5, a burnished polished effect is achieved. The same effect may be accomplished by using a metal trowel to rub the surface of the layer or layers of the compound of block 3, FIG. 1 in order to bring out the desired sheen. Selected areas may be rubbed harder so that these areas will have a more glossy and shiny surface. The more lightly rubbed areas will appear to have a more flat or dull appearance.

The sixth and final step illustrated in block 11, FIG. 1, which is optional, could include an additional application of wax, either singularly or containing any one of a colored, metallic or luminescent pigment as layer 12 over layer 8, FIG. 2 or any layer in order to enhance the layers below. This application of wax then may be polished or left dull.

While I have described above the principles of my invention in connection with specific apparatus, it is to be clearly understood that this description is made only by way of example and not as a limitation to the scope of my invention as set forth in the objects thereof and in the accompanying claims.

I claim:

1. A flexible wall covering to replicate a finish selected from a traditional encaustic finish, a traditional stone finish and a traditional plaster finish comprising:

a flexible carrier sheet; and at least one layer of a dried flexible resin-synthetic encaustic plaster compound disposed on said flexible carrier sheet in a predetermined pattern, said one layer of said dried flexible resin-synthetic encaustic plaster compound having a desired sheen to replicate a finish selected from a traditional encaustic finish, a traditional stone finish, and a traditional plaster finish, said flexible resin of said dried flexible resin-synthetic encaustic plaster compound being bonded to said flexible carrier sheet to provide flexibility to said dried flexible resin-synthetic encaustic compound to enable said flexible carrier sheet coated with said dried flexible resin-synthetic without cracking and delaminating.

2. A dried flexible wall covering according to claim 1, wherein said one layer of said flexible resin-synthetic encaustic plaster compound includes voids therein to provide said predetermined pattern.

3. A flexible wall covering according to claim 2, further including at least a second layer of said dried flexible resin-synthetic encaustic plaster compound covering said one layer of said flexible resin-synthetic encaustic plaster compound and at least coating said voids.

4. A flexible wall covering according to claim 3, wherein dried said flexible resin-synthetic encaustic plaster compound includes a pigment having a desired color to impart to said one and said second layer of said flexible resin-synthetic encaustic plaster compound said desired color.

5. A flexible wall covering according to claim 4, wherein said pigment includes a pigment selected from the group consisting of a pigment having said desired color and a mixture of a pigment having said desired color and water.

6. A flexible wall covering according to claim 5, wherein said flexible resin of said dried flexible resin-synthetic encaustic plaster compound includes a flexible resin selected from the group consisting of a synthetic resin, a natural flexible resin and an acrylic flexible resin.

7. A flexible wall covering according to claim 6, further including an additional layer selected from the group consisting of a wax and a wax including a pigment selected from the group consisting of a colored pigment, a metallic pigment and a luminescent pigment shined to a given sheen to enhance layers of said dried flexible resin-synthetic encaustic plaster compound below said additional layer.

* * * * *